United States Patent
Eshraghi

(10) Patent No.: US 6,746,192 B2
(45) Date of Patent: Jun. 8, 2004

(54) ANTI-ROTATION TACKING RIVET HAVING RIBS

(75) Inventor: Soheil Eshraghi, Irvine, CA (US)

(73) Assignee: Textron Inc., Providence, RI (US)

( * ) Notice: Subject to any disclaimer, the term of this patent is extended or adjusted under 35 U.S.C. 154(b) by 25 days.

(21) Appl. No.: 10/034,942

(22) Filed: Dec. 27, 2001

(65) Prior Publication Data

US 2003/0123949 A1 Jul. 3, 2003

(51) Int. Cl.⁷ ................................................ F16B 13/04
(52) U.S. Cl. ......................................... 411/37; 411/71
(58) Field of Search ...................... 411/34, 37, 49–53, 411/501, 71, 73

(56) References Cited

U.S. PATENT DOCUMENTS

| | | | |
|---|---|---|---|
| 3,279,303 A | * | 10/1966 | Shackelford |
| 4,285,265 A | | 8/1981 | Reiper |
| 4,781,500 A | * | 11/1988 | Mauer |
| 5,551,816 A | * | 9/1996 | Brewer |
| 5,689,873 A | | 11/1997 | Luhm |
| 6,186,717 B1 | * | 2/2001 | Cosenza |

* cited by examiner

Primary Examiner—Flemming Saether
(74) Attorney, Agent, or Firm—Trexler, Bushnell, Giangiorgi, Blackstone & Marr, Ltd.

(57) ABSTRACT

The present invention provides a tacking rivet for fastening work pieces together which have aligned apertures therethrough. The tacking rivet includes a head portion and an elongated sleeve portion extending from the head portion. Both the head portion and the sleeve portion have openings therethrough which are in alignment with one another. The tacking rivet further includes a plurality of rib portions positioned on an outer surface of the sleeve portion which are capable of engaging with walls of the apertures of the work pieces when the sleeve portion is expanded within the apertures of the work pieces. Because the rib portions engage with the walls of the apertures of the work pieces, the tacking rivet will not rotate within the apertures during a drilling operation to remove the tacking rivet from the apertures prior to the installation of a permanent fastener to fasten the work pieces together.

15 Claims, 2 Drawing Sheets

ANTI-ROTATION TACKING RIVET HAVING RIBS

BACKGROUND OF THE INVENTION

The present invention relates to a rivet for temporarily fastening two adjacent work pieces together.

Rivets are typically used for permanently fastening adjacent work pieces together. The work pieces typically have apertures therethrough which are in alignment with one another and rivets are then inserted into the apertures. The rivets are then connected to walls of the apertures by expansion of a sleeve of the rivet by suitable means. The expansion of the sleeve against the walls of the apertures provides a tight fit to permanently fasten the work pieces together.

In many operations, such as in the construction of a fuselage of an airplane, panels are attached to a frame by the use of hundreds and thousands of rivets. Prior to the fastening of the rivets to the frame and the panels, though, the operator must ensure that the apertures of the panels and the frame stay in alignment. Thus, prior to the permanent fastening of rivets to the apertures of the panels and the frame, tacking rivets are inserted into a percentage, i.e., 1 in every 10, of the aligned apertures to ensure proper alignment of all of the apertures.

After the tacking rivets are inserted into a percentage of the apertures, the operator begins to attach rivets to the apertures of the panels and the frame to permanently attach the panels to the frame. When the operator comes upon apertures which have previously been attached by the tacking rivets, the operator removes the tacking rivet by drilling through a head and sleeve of the tacking rivet and the work pieces with a drill of a proper diameter. Once the tacking rivet is removed from the apertures of the work pieces, the operator installs a permanent rivet within the apertures of the work pieces to permanently attach the panels to the frame.

It has been found that during the drilling of such tacking rivets, the tacking rivets often succumb to the rotation of the drill by turning or spinning with the drill during the drilling operation which can interfere with and cause problems with the drilling operation. Thus, there is a need for a tacking rivet which will not present the problems caused by prior art tacking rivets which turn or spin with the drill during the drilling operation. The present invention provides a tacking rivet which overcomes the disadvantages and problems of prior art tacking rivets, such that it will not turn or spin with the drill during the drilling operation.

OBJECTS AND SUMMARY OF THE INVENTION

A primary object of the invention is to provide a tacking rivet used for attaching work pieces together which does not turn or spin during a drilling operation.

An object of the invention is to provide a tacking rivet which effectively and temporarily attaches work pieces together by expansion of a sleeve of the tacking rivet against walls of apertures within the work pieces.

Another object of the invention is to provide a tacking rivet which effectively prevents turning or spinning of the tacking rivet during a drilling operation by embedding a plurality of ribs on a sleeve of the tacking rivet into walls of apertures within the work pieces during the expansion of a sleeve of the tacking rivet.

Briefly, and in accordance with the foregoing, the present invention provides a tacking rivet for fastening work pieces together which have aligned apertures therethrough. The tacking rivet includes a head portion and an elongated sleeve portion extending from the head portion. Both the head portion and the elongated sleeve portion have openings therethrough which are in alignment with one another. The tacking rivet further includes a plurality of rib portions positioned on an outer surface of the elongated sleeve portion which are capable of engaging with walls of the apertures of the work pieces when the elongated sleeve portion is expanded within the apertures of the work pieces. Because the rib portions engage with the walls of the apertures of the work pieces, the tacking rivet will not rotate within the apertures during a drilling operation to remove the tacking rivet from the apertures prior to the installation of a permanent fastener to fasten the work pieces together.

BRIEF DESCRIPTION OF THE DRAWINGS

The features of the present invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENTS

Figure 1:
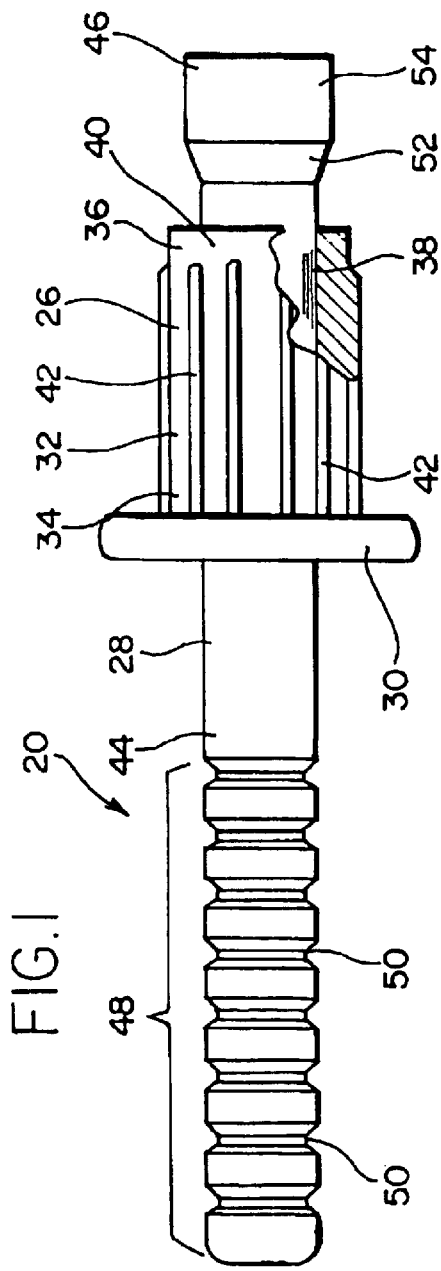
FIG. 1 is a side view of a tacking rivet of the present invention.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated and described herein.

Figure 2:
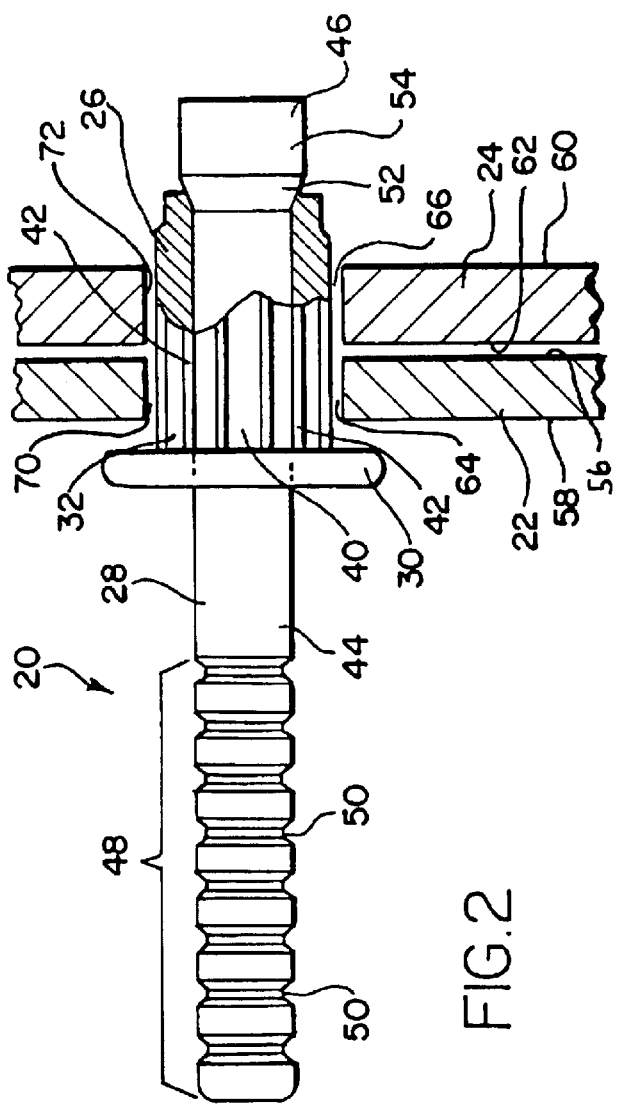
FIG. 2 is a side sectional view showing the tacking rivet inserted into apertures of two adjacent work pieces.
Figure 3:
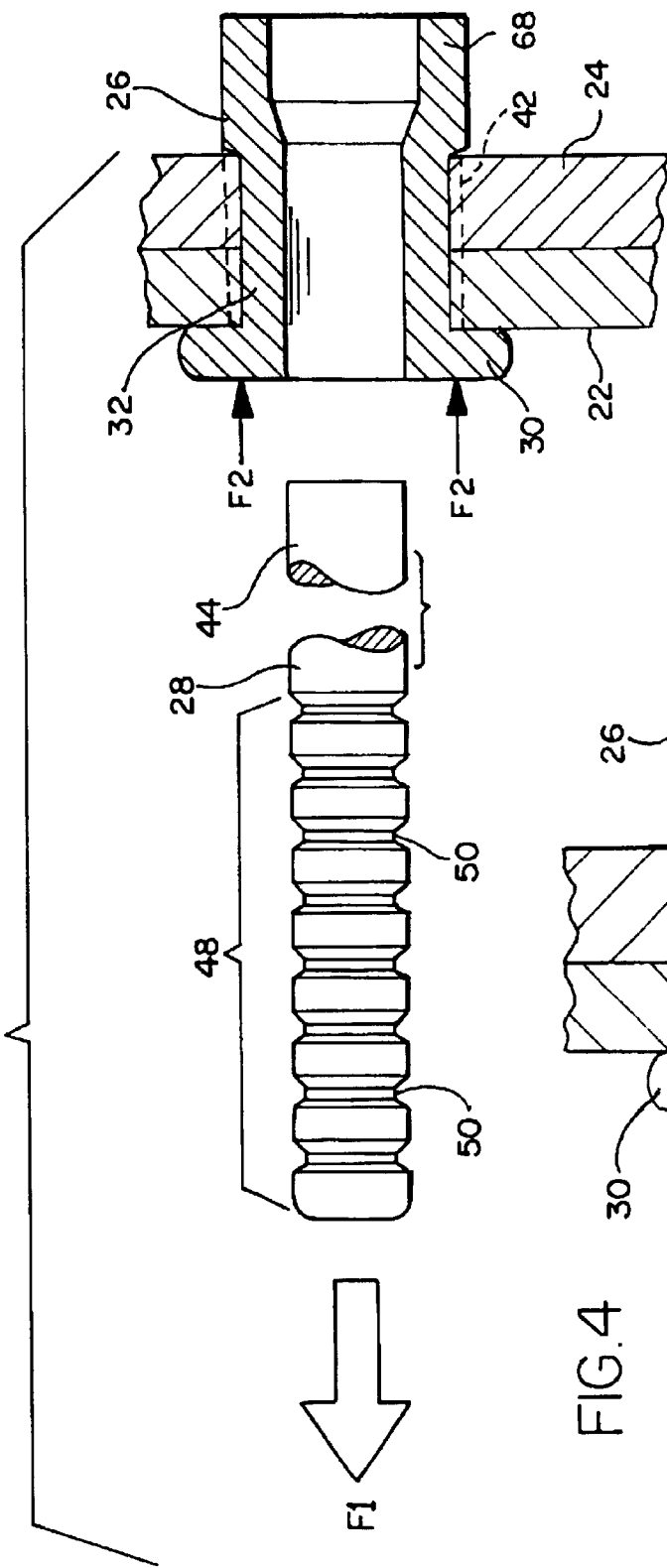
FIG. 3 is a side view showing a stem pulled through a sleeve of the tacking rivet, which is shown in cross-section.
Figure 4:
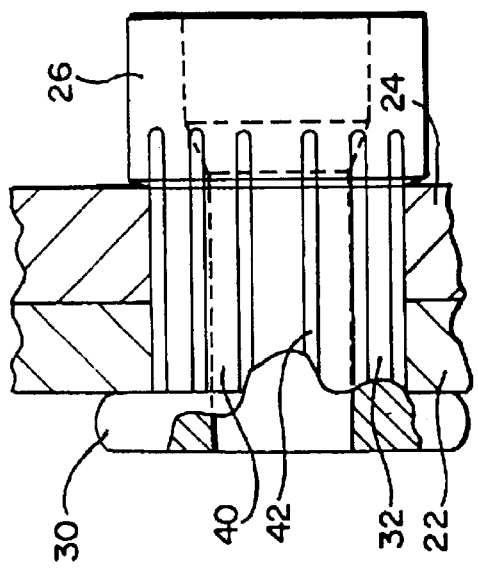
FIG. 4 is a side view of the tacking rivet attached to walls of the apertures of the two adjacent work pieces.

A tacking fastener 20 is illustrated in FIG. 1 and is typically used to temporarily fasten two adjacent work pieces 22, 24 together, see FIGS. 2–4. The tacking fastener 20 typically includes a tacking rivet 26 and a stem member 28.

The tacking rivet 26 includes a head portion 30 and a sleeve portion 32 having a first end 34 and a second end 36. The head portion 30 extends from the first end 34 of the sleeve portion 32 and has a diameter which is larger than a diameter of the sleeve portion 32. An opening 38 is also provided in the tacking rivet 26 and extends through both the sleeve portion 32 and the head portion 30 of the tacking rivet 26. The head portion 30 could also be provided with a divider (not shown), such as a slot, recess or indentation, such as those illustrated and discussed in U.S. Pat. No. 4,285,265, which would divide the head portion 30 into at least two portions, for reasons which will be discussed hereinbelow.

An outer surface 40 of the sleeve portion 32 is provided with a plurality of protruding rib portions 42. The rib portions 42 preferably extend longitudinally from the first end 34 of the sleeve portion 32 toward the second end 36 of the sleeve portion 32. It should be noted that the rib portions 42 could also have other configurations on the outer surface 40 of the sleeve portion 32, provided that the configurations of the rib portions 42 accomplish the objectives of the tacking rivet 26 as discussed hereinabove and hereinbelow.

The stem member 28 includes an elongated shank 44 and an enlarged stem head 46 extending therefrom. The elongated shank 44 extends through the opening 38 of the tacking rivet 26 such that the enlarged stem head 46 is positioned proximate to the second end 36 of the sleeve portion 32 of the tacking rivet 26. The elongated shank 44 has a pulling portion 48 at its outer end, which is positioned distal to the second end 36 of the sleeve portion 32 of the tacking rivet 26 and proximate to the head portion 30 of the tacking rivet 26. The pulling portion 48 is provided with a plurality of annular pull grooves 50 so that it can be gripped by a conventional pull type tool (not shown) to pull the enlarged stem head 46 through the opening 38 of the tacking rivet 26. Such tools are well known in the art and, therefore, the details thereof have been omitted for purposes of brevity and simplicity.

The enlarged stem head 46 has a tapered portion 52 which helps to lead the enlarged stem head 46 into the opening 38 of the tacking rivet 26 at the second end 36 of the sleeve portion 32. The tapered portion 52 extends to an annular tip portion 54 which has a diameter that is larger that a diameter of the opening 38 of the tacking rivet 26 so that the enlarged stem head 46 expands the sleeve portion 32 as the stem member 28 is pulled through the opening 38 of the tacking rivet 26.

The enlarged stem head 46 may also have a cavity (not shown) therein which will allow the enlarged stem head 46 to contract when the stem member 28 is pulled through the tacking rivet 26.

FIGS. 2–4 illustrate the installation of the tacking rivet 26 to temporarily attach the first work piece 22 to the second work piece 24. The first work piece 22 generally has flat inner and outer surfaces 56, 58 while the second work piece 24 also generally has a flat inner and outer surfaces 60, 62. The inner surface 56 of the first work piece 22 and the outer surface 62 of the second work piece 24 generally abut against one another such that the work pieces 22, 24 are adjacent to one another. The inner surface 60 of the second work piece 24 is typically a blind surface such that an operator typically cannot access the inner surface 60 of the second work piece 24.

As illustrated in FIG. 2, each of the work pieces 22, 24 has an aperture 64, 66 provided therethrough. The apertures 64, 66 of the work pieces 22, 24 are in alignment with one another. The apertures 64, 66 generally have diameters which are slightly larger than the diameter of the sleeve portion 32 of the tacking rivet 26 such that the tacking rivet 26, having the rib portions 42 on the outer surface 40 of the tacking rivet 26, and having the stem member 28 inserted therethrough, can be easily inserted into the apertures 64, 66 of the work pieces 22, 24. The enlarged stem head 46 and the second end 36 of the sleeve portion 32 of the tacking rivet 26 extend from the inner or blind surface 60 of the second work piece 24 while the pulling portion 48 and the head portion 30 of the tacking rivet 26 extend from the outer surface 58 of the first work piece 22.

As illustrated in FIG. 3, the stem member 28 is pulled through the sleeve portion 32 of the tacking rivet 26 by applying a pulling axial force F1 to the elongated shank 44 at the pulling portion 48 thereof by a conventional pull type tool. At the same time, a force F2 is applied to a top surface of the head portion 30 of the tacking rivet 26 to provide resistance to the force F1. Upon the application of the axial force F1 to the elongated shank 44, the enlarged stem head 46 initially is pulled into the opening 38 of the tacking rivet 26 at the second end 36 of the sleeve portion 32, such that the sleeve portion 32 at the second end 36 thereof forms an upset portion 68 which bears against the work piece 24.

As the enlarged stem head 46 continues to be pulled through the opening 38 of the sleeve portion 32 of the tacking rivet 26, the enlarged stem head 46 expands the sleeve portion 32 of the tacking rivet 26 within the apertures 64, 66 of the work pieces 22, 24. As the sleeve portion 32 of the tacking rivet 26 is being expanded within the apertures 64, 66 of the work pieces 22, 24, the outer surface 40 of the sleeve portion 32 comes into tight engagement with walls 70, 72 of the apertures 64, 66 of the work pieces 22, 24 and the rib portions 42 on the outer surface 40 of the sleeve portion 32 of the tacking rivet 26 become embedded within the walls 70, 72 of the apertures 64, 66 of the work pieces 22, 24.

As illustrated in FIGS. 3 and 4, the head portion 30 of the tacking rivet 26 is seated onto the outer surface 58 of the first work piece 22. The installed tacking rivet 26 then is capable of holding together the work pieces 22, 24 while an operator installs permanent rivets (not shown) into the work pieces 22, 24. The installed tacking rivet 26, which is temporary, is then removed from the apertures 64, 66 of the work pieces 22, 24 and replaced by a permanent rivet.

The installed, temporary tacking rivets 26 are typically removed by a drilling process. In the drilling process, a drill bit (not shown) drills through the head portion 30 of the tacking rivet 26, and then through the sleeve portion 32 of the tacking rivet 26 and the work pieces 22, 24, in order to remove the installed, temporary tacking rivet 26 and create a hole for a permanent rivet. The diameter of the drill bit can either be larger or smaller than a diameter of the head portion 30 of the tacking rivet 26 as desired.

As the rib portions 42 of the tacking rivet 26 are embedded into the walls 70, 72 of the apertures 64, 66 of the work pieces 22, 24, the installed tacking rivet 26 does not succumb to rotation within the apertures 64, 66 of the work pieces 22, 24 during the drilling process. Because the installed tacking rivet 26 does not rotate or spin during the drilling process, no undesired damage is done to the work pieces 22, 24, such as scratching of the surfaces.

In order to further prevent scratching of the outer surface 58 of the work piece 22, the head portion 30 may have been provided with dividers as discussed hereinabove. The dividers provided on the head portion 30 of the tacking rivet 26 provide that the head portion 30 will break off once the drill bit has drilled through the head portion 30 of the tacking rivet 26, thus preventing the head portion 30 from scratching the outer surface 58 of the work piece 22.

While a preferred embodiment of the present invention is shown and described, it is envisioned that those skilled in the art may devise various modifications of the present invention without departing from the spirit and scope of the appended claims.

The invention is claimed as follows:

1. A tacking rivet for fastening at least two work pieces together which have aligned apertures therethrough, said tacking rivet comprising:
   a head portion having an opening therethrough, said head portion configured to be positioned proximate to one of said at least two work pieces, said head portion further configured to be larger than said aligned apertures of said at least two workpieces;
   an elongated sleeve portion which extends from said head portion and through said aligned apertures of said at least two workpieces, said elongated sleeve portion having an opening therethrough which is in alignment with said opening of said head portion; and
   a plurality of rib portions positioned on an outer surface of said elongated sleeve portion which are capable of engaging with a wall of at least one of the apertures of the at least two work pieces when said elongated sleeve portion is expanded within the apertures of the work pieces in order to prevent rotation of said tacking rivet during a drilling operation to remove said tacking rivet from the apertures of the work pieces.

2. A tacking rivet as defined in claim 1, wherein said plurality of rib portions extend longitudinally along said elongated sleeve portion.

3. A tacking rivet as defined in claim 1, wherein said elongated sleeve portion is expanded within the apertures of the work pieces by a stem.

4. A tacking rivet as defined in claim 1, wherein said head portion has means for dividing said head portion into two separate portions, said dividing means preventing said two separate portions from remaining stuck on a drill bit during said drilling operation.

5. A tacking rivet as defined in claim 1, wherein said plurality of rib portions are capable of engaging with said walls of said aligned apertures of said at least two work pieces.

6. A tacking fastener for fastening at least two work pieces together which have aligned apertures therethrough, said tacking fastener comprising:
   a stem having an elongated stem shank with an enlarged stem head which extends to an end of said elongated stem shank and gripping means which are provided at an opposite end of said elongated stem shank; and
   a tacking rivet having an opening therethrough, said tacking rivet including,
      a head portion which is configured to be positioned proximate to one of said at least two work pieces, said head portion further configured to be larger than said aligned apertures of said at least two workpieces,
      an elongated sleeve portion which extends from said head portion and through said aligned apertures of said at least two workpieces, said elongated sleeve portion, and
      a plurality of rib portions positioned on an outer surface of said elongated sleeve portion,
   said elongated stem shank extending within said opening of said tacking rivet such that said enlarged stem head is distal from said head portion of said tacking rivet and said gripping means is proximate to said head portion,
   said enlarged stem head being adapted to move into said opening of said tacking rivet to expand said elongated sleeve portion within the apertures of the work pieces to force said plurality of rib portions to engage with a wall of at least one of the apertures,
   said engagement of said plurality of rib portions with the wall of at least one of the apertures preventing rotation of said tacking rivet during a drilling operation to remove said tacking rivet from the apertures of the work pieces.

7. A tacking fastener as defined in claim 6, wherein said plurality of ribs extend longitudinally along said elongated sleeve portion.

8. A tacking fastener as defined in claim 6, wherein said head portion has means for dividing said head portion into two separate portions, said dividing means preventing said two separate portions from remaining stuck on a drill bit during said drilling operation.

9. A tacking fastener as defined in claim 6, wherein said engagement of said plurality of rib portions with the walls of said aligned apertures of said at least two work pieces prevent rotation of said tacking rivet.

10. A joint comprising:
    at least two work pieces being positioned alongside one another, each said work piece having an aperture therethrough, said apertures of said work pieces being in alignment;
    a tacking rivet having a head portion which is configured to be positioned proximate to one of said at least two work pieces, said head portion further configured to be larger than said aligned apertures of said at least two workpieces, an elongated sleeve portion which extends from said head portion and through said aligned apertures of said at least two workpieces, said elongated sleeve portion, and a plurality of rib portions positioned on an outer surface of said elongated sleeve portion, said plurality of rib portions being embedded within walls of at least one of said apertures of said work pieces and said head portion being positioned against a surface of one of said work pieces such that said tacking rivet attaches said at least two work pieces together,
    said plurality of rib portions preventing rotation of said tacking rivet during a drilling operation to remove said tacking rivet from said joint.

11. A joint as defined in claim 10, wherein said plurality of rib portions extend longitudinally along said elongated sleeve portion.

12. A joint as defined in claim 10, wherein said head portion has means for dividing said head portion into two separate portions, said dividing means preventing said two separate portions from remaining stuck on a drill bit during said drilling operation.

13. A joint as defined in claim 10, wherein said plurality of rib portions are embedded within walls of said apertures of said at least two work pieces.

14. A method of attaching at least two work pieces together which have aligned apertures therethrough, said method comprising the steps of:
   a) providing a stem having an elongated stem shank with an enlarged stem head which extends to an end of said elongated stem shank and gripping means which are provided at an opposite end of said elongated stem shank;
   b) providing a temporary tacking rivet having an opening therethrough which includes a head portion, an elongated sleeve portion extending from said head portion, and a plurality of rib portions positioned on an outer surface of said elongated sleeve portion;

c) inserting said elongated stem shank into and through said opening of said tacking rivet such that said enlarged stem head is positioned distal to said head portion and said gripping means is positioned proximate to said head portion;

d) inserting said elongated sleeve portion into and through the apertures of the work pieces such that said head portion is positioned against a surface of one of the work pieces;

e) applying an axial force to said stem to pull said enlarged stem head into said opening of said tacking rivet to expand said elongated sleeve portion within the apertures and to embed said plurality of rib portions into a wall of at least one of the apertures of the work pieces, thereby attaching the work pieces together;

f) drilling said head portion, said elongated sleeve portion and the work pieces with a drill bit;

g) inserting a permanent fastener into the apertures of the work pieces to permanently attach the work pieces together.

15. A method as defined in claim 14, wherein said plurality of rib portions are embedded into walls of said apertures of said at least two work pieces.

* * * * *